(12) United States Patent
He

(10) Patent No.: US 10,234,049 B1
(45) Date of Patent: Mar. 19, 2019

(54) PULL-OUT FAUCET

(71) Applicant: Globe Union Industrial Corp., Taichung (TW)

(72) Inventor: Kaizhong He, Shen Zen (CN)

(73) Assignee: Globe Union Industrial Corp., Taichung (TW)

( * ) Notice: Subject to any disclaimer, the term of this patent is extended or adjusted under 35 U.S.C. 154(b) by 0 days.

(21) Appl. No.: 15/789,029

(22) Filed: Oct. 20, 2017

(51) Int. Cl.
*E03C 1/086* (2006.01)
*F16K 11/00* (2006.01)
*F16K 31/60* (2006.01)
*E03C 1/04* (2006.01)

(52) U.S. Cl.
CPC .......... *F16K 19/006* (2013.01); *E03C 1/0403* (2013.01); *E03C 1/0412* (2013.01); *F16K 31/605* (2013.01); *E03C 2001/0415* (2013.01)

(58) Field of Classification Search
CPC ................. F16K 19/006; E03C 1/0403; E03C 2001/0415
See application file for complete search history.

(56) References Cited

U.S. PATENT DOCUMENTS

| 6,757,921 | B2 | 7/2004 | Esche | |
|---|---|---|---|---|
| 8,631,816 | B2* | 1/2014 | Hsu | E03C 1/04 137/315.12 |
| 8,944,093 | B2* | 2/2015 | Veros | E03C 1/04 137/315.13 |
| 2004/0010848 | A1* | 1/2004 | Esche | E03C 1/04 4/675 |
| 2008/0276367 | A1* | 11/2008 | Bares | E03C 1/04 4/677 |
| 2009/0242058 | A1* | 10/2009 | Hansen | E03C 1/0403 137/801 |
| 2015/0292187 | A1* | 10/2015 | Tseng | E03C 1/055 4/677 |

* cited by examiner

*Primary Examiner* — Reinaldo Sanchez-Medina
(74) *Attorney, Agent, or Firm* — Alan D. Kamrath; Kamrath IP Lawfirm, P.A.

(57) ABSTRACT

A pull-out faucet contains: a hollow body, a control valve assembly, a water supply pipe set, a water hose, and a spray head. The water supply pipe set includes a cold-water inflow tube, a hot-water inflow tube, and a mixing outflow tube. The hollow body includes a longitudinal chamber and an accommodation groove, and two opposite stop plates are arranged on a communication portion of the longitudinal chamber and the accommodation groove. The control valve assembly includes a right-angle valve block having a first channel, a second channel, a third channel, a first coupling tube, a second coupling tube, a third coupling tube, and two shoulders. The control valve assembly further includes a joining element, a mixing valve, a first cap configured to fix the mixing valve in the accommodation groove, and an operation lever configured to turn on/off and control the mixing valve.

12 Claims, 21 Drawing Sheets

US 10,234,049 B1

PULL-OUT FAUCET

FIELD OF THE INVENTION

The present invention relates to a pull-out faucet, and more particularly to the pull-out faucet which contains a right-angle valve block accommodated in the pull-out faucet from a bottom of a hollow body via a longitudinal chamber.

BACKGROUND OF THE INVENTION

A conventional pull-out faucet is disclosed in U.S. Pat. No. 6,757,921 and contains a right-angle valve block accommodated in a hollow body from an opening. In assembly, the cold-water inlet tube, the hot-water inlet tube, and the mixing outlet tube are in connection with and are inserted through the right-angle valve block from the opening until the right-angle valve block is fixed. The mixing valve is housed in the opening.

However, before the right-angle valve block is fixed, it stocks in the opening and cannot move into the hollow body. Furthermore, the right-angle valve block friction with the opening easily. When the cold-water inlet tube and the hot-water inlet tube are made of metal, they cannot bend and deform, hence water leaks among the cold-water inlet tube, the hot-water inlet tube, and the right-angle valve block.

A size of the right-angle valve block is less than an inner diameter of the opening to reduce using versatility.

Furthermore, each of the cold-water inflow tube, the hot-water inflow tube, and the mixing outflow tube has outer threads so as to screw with the right-angle valve block, but it takes long time to screw the cold-water inflow tube, the hot-water inflow tube, and the mixing outflow tube with the right-angle valve block.

The present invention has arisen to mitigate and/or obviate the afore-described disadvantages.

SUMMARY OF THE INVENTION

The primary aspect of the present invention is to provide a pull-out faucet in which the right-angle valve block is accommodated in the accommodation groove easily and to avoid a collision of the right-angle valve block with the casing.

To obtain the above aspect, a pull-out faucet provided by the present invention contains: a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose.

The water supply pipe set includes a cold-water inflow tube, a hot-water inflow tube, and a mixing outflow tube.

The hollow body includes a longitudinal chamber defined therein and includes an accommodation groove communicating with the longitudinal chamber; and two opposite stop plates are arranged on a communication portion of the longitudinal chamber and the accommodation groove.

The control valve assembly includes: a right-angle valve block having a first channel configured to flow cold water, a second channel configured to flow hot water, and a third channel configured to flow mixing water of the cold water and the hot water; wherein the first channel, the second channel, and the third channel are arranged on a bottom of the right-angle valve block. The right-angle valve block has a first coupling tube, a second coupling tube, and a third coupling tube which are arranged on an outer wall of the right-angle valve block, wherein the first coupling tube communicates with the first channel, the second coupling tube is in communication with the second channel, and the third coupling tube communicates with the third channel, the right-angle valve block further has two shoulders, one of which is defined between outer walls of the first coupling tube and the third coupling tube, and the other shoulder is defined between outer walls of the second coupling tube and the third coupling tube, wherein the right-angle valve block further has two opposite stopping faces respectively formed on the outer wall thereof opposite to the two shoulders, and between each of the two shoulders and each of the two stopping faces is defined a locking slot; wherein when the right-angle valve block is upwardly inserted into the longitudinal chamber of the hollow body and facing the accommodation groove, and the right-angle valve block is pulled downwardly so that the locking slot retains with each of the two opposite stop plates, thus avoiding a removal of the right-angle valve block the accommodation groove.

The control valve assembly includes a joining element accommodated in the accommodation groove and connecting with the first coupling tube, the second coupling tube, and the third coupling tube of the right-angle valve block.

The control valve assembly includes a mixing valve housed in the accommodation groove and contacting with the joining element so as to communicate with the first coupling tube, the second coupling tube, and the third coupling tube.

The control valve assembly includes a first cap configured to fix the mixing valve in the accommodation groove and includes an operation lever configured to turn on/off and control the mixing valve.

DETAILED DESCRIPTION OF THE PREFERRED EMBODIMENTS

Figure 1:
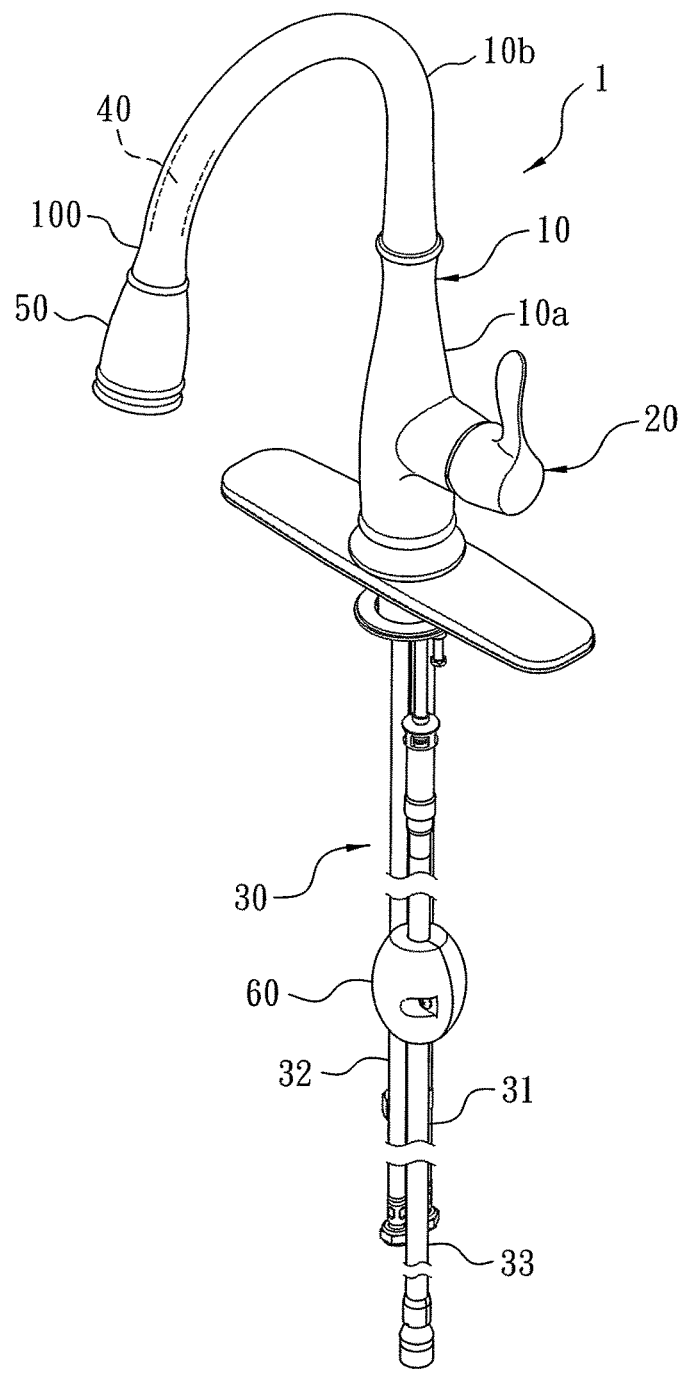
FIG. 1 is a perspective view showing the assembly of a pull-out faucet according to a preferred embodiment of the present invention.
Figure 2:
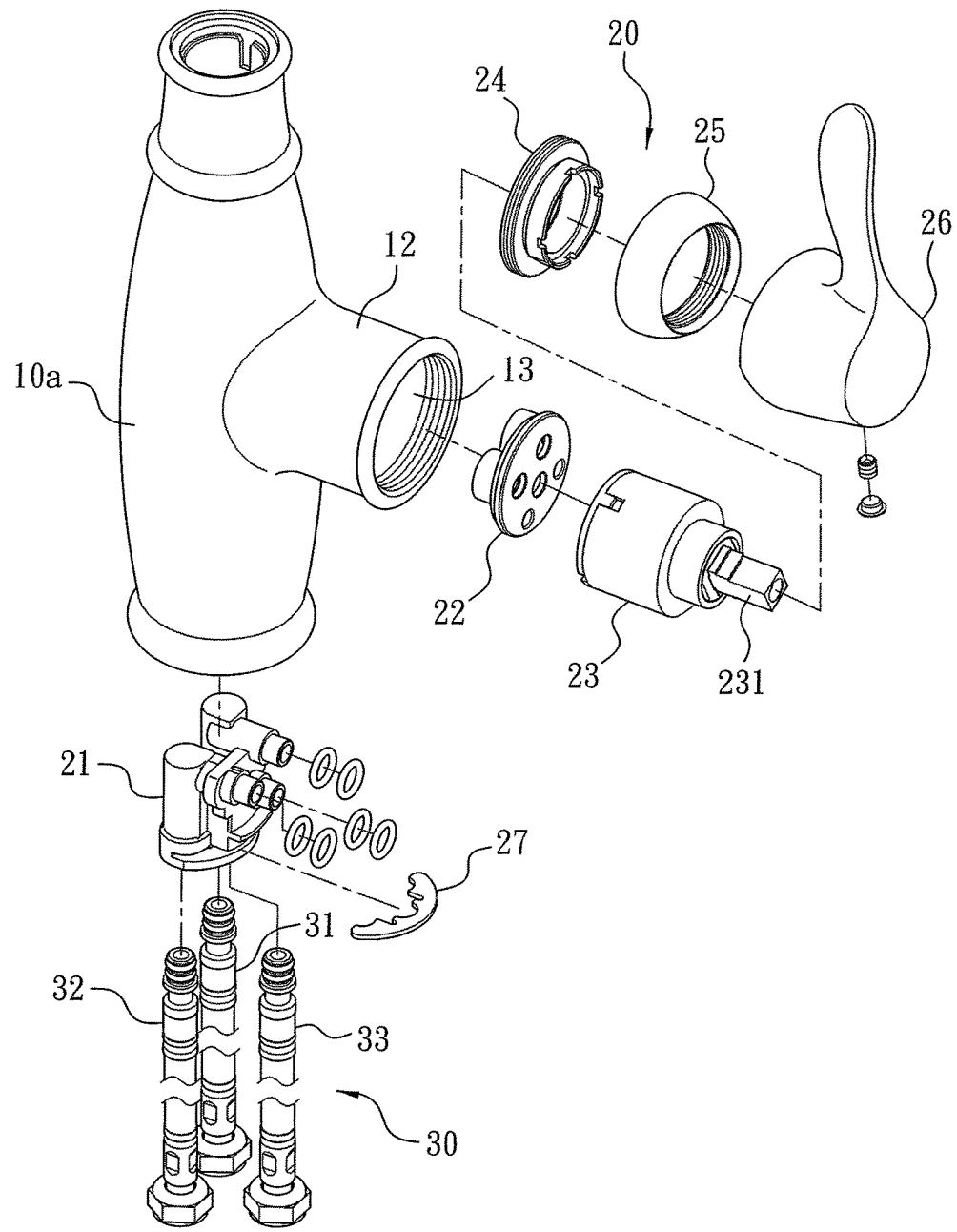
FIG. 2 is a perspective view showing the exploded components of a part of the pull-out faucet according to the preferred embodiment of the present invention.
Figure 3:
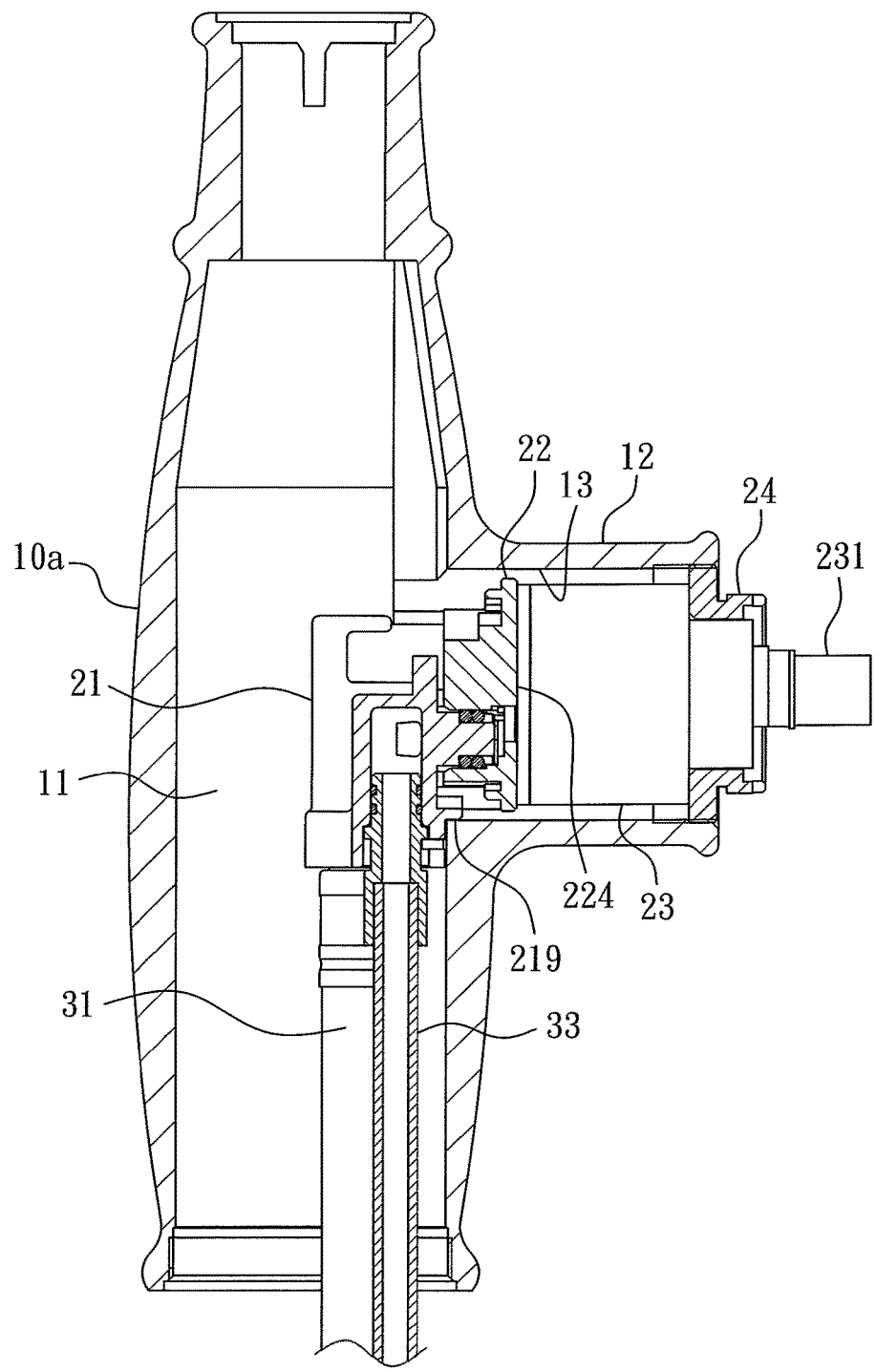
FIG. 3 is a cross sectional view showing the assembly of a part of the pull-out faucet according to the preferred embodiment of the present invention.

With reference to FIGS. 1-3, a pull-out faucet 1 according to a preferred embodiment of the present invention comprises: a hollow body 10, a control valve assembly 20 mounted on the hollow body 10, a water supply pipe set 30 communicating with the control valve assembly 20, a water hose 40 communicating with the water supply pipe set 30 so as to supply water, and a spray head 50 disposed on an outlet segment 100 of the hollow body 10 and communicating with the water hose 40.

The water supply pipe set 30 includes a cold-water inflow tube 31, a hot-water inflow tube 32, and a mixing outflow tube 33. After cold water and hot water flow into the control valve assembly 20 from the cold-water inflow tube 31 and the hot-water inflow tube 32 respectively, mixing water of the cold water and the hot water flow to the spray head 50 from the mixing outflow tube 33 via the water hose 40 so that the spray head 50 is pulled outwardly by user so as to spray the mixing water based on using requirements. Thereafter, the spray head 50 automatically returns back to the outlet segment 100 of the hollow body 10 after being released.

A counterweight 60 is connected with the water hose 40 so as to provide an automatic returning force.

Figure 4:
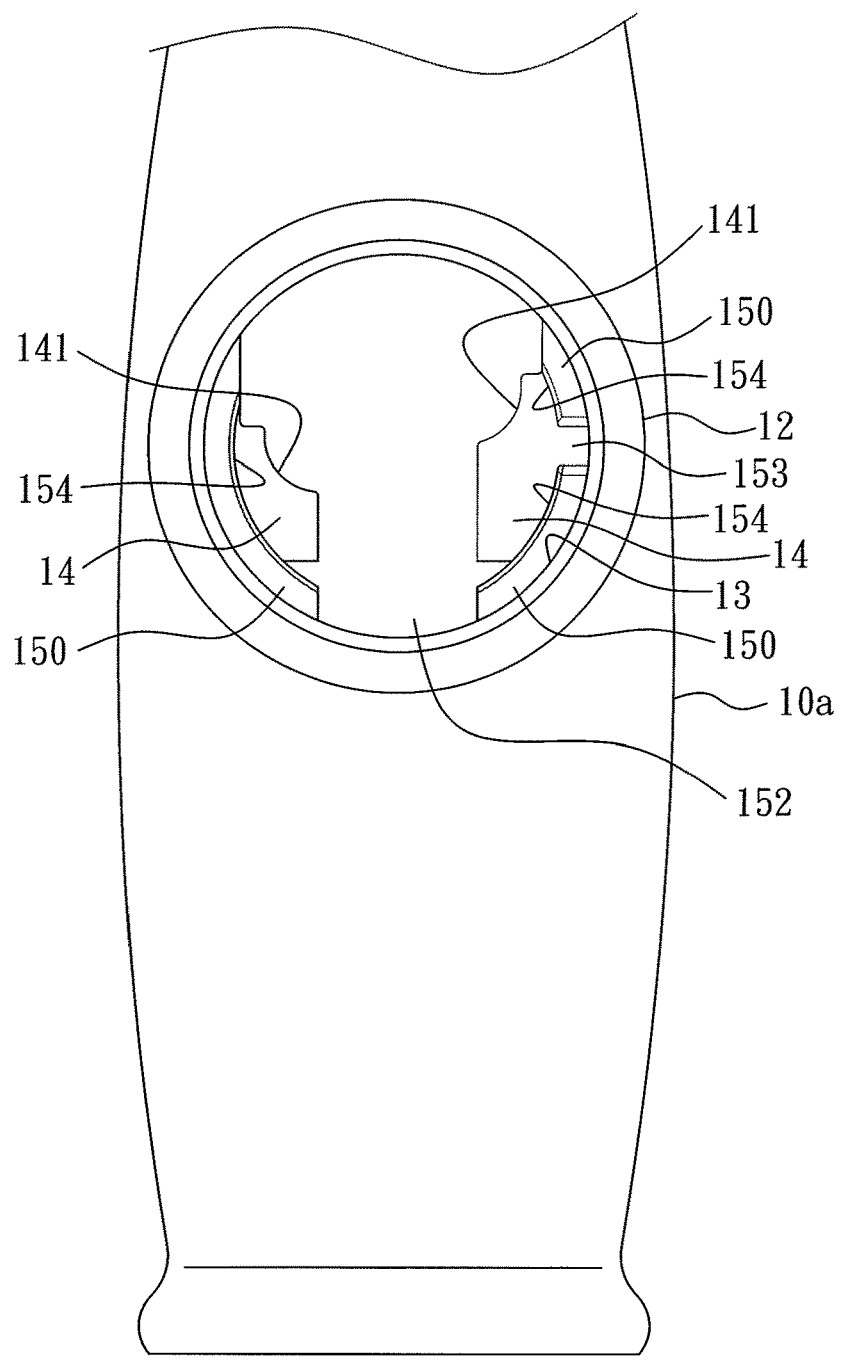
FIG. 4 is a side plan view showing the assembly of a part of the pull-out faucet according to the preferred embodiment of the present invention.
Figure 5:
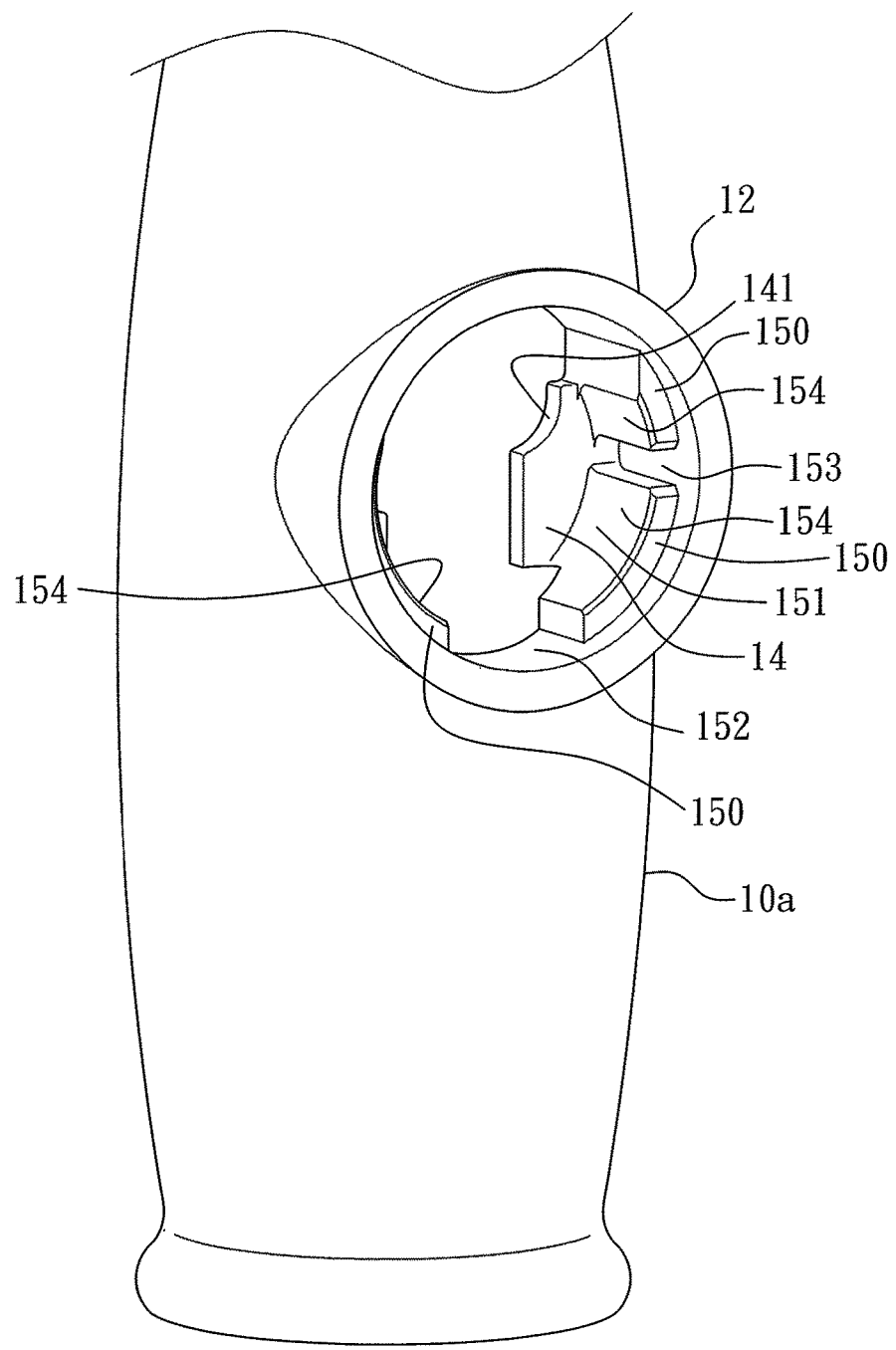
FIG. 5 is a perspective view showing the assembly of a part of the pull-out faucet according to the preferred embodiment of the present invention.
Figure 6:
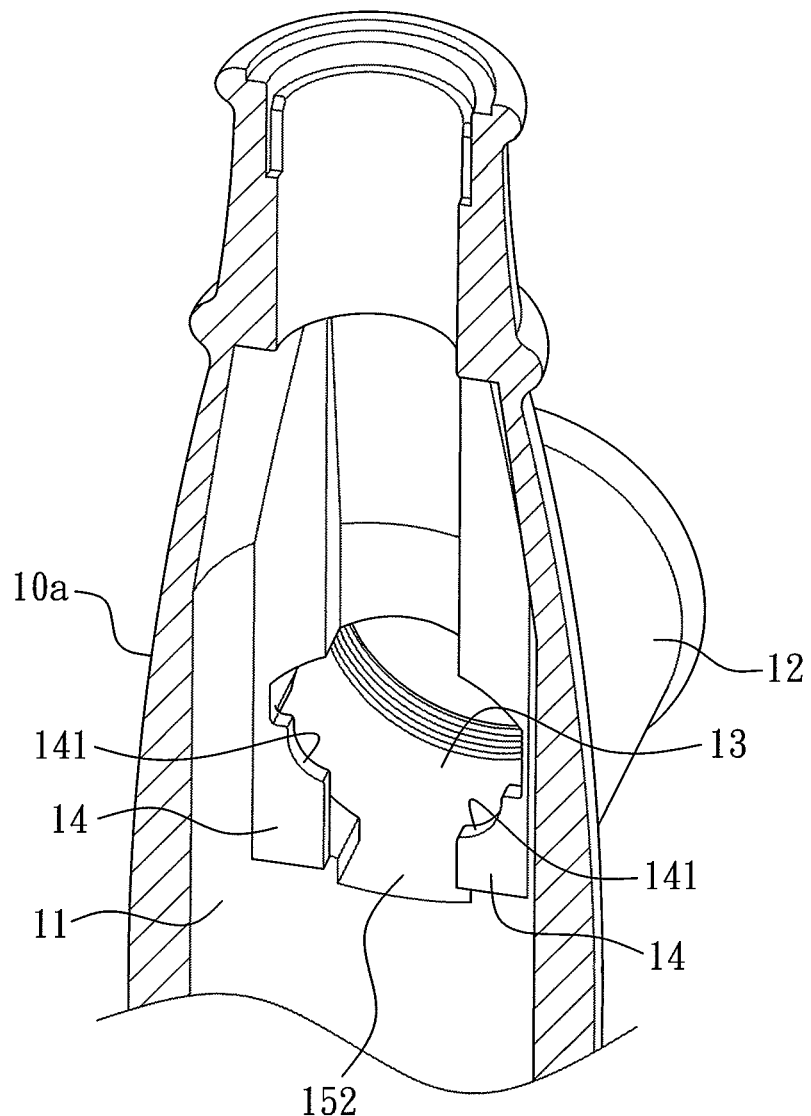
FIG. 6 is a cross-sectional perspective view showing the assembly of a part of the pull-out faucet according to the preferred embodiment of the present invention.

The hollow body 10 includes a casing 10a and a bent tube 10b extending outwardly from a top of the casing 10a. As shown in FIGS. 4-6, the casing 10a has a longitudinal chamber 11 defined therein, a seat portion 12 horizontally extending outward from the casing 10a, an accommodation groove 13 formed in the seat portion 12 and communicating with the longitudinal chamber 11, two opposite stop plates 14 arranged on a communication portion of the longitudinal chamber 11 and the accommodation groove 13, and each of the two stop plates 14 has a concaved support fringe 141 formed on a top thereof. The accommodation groove 13 has a fixing portion 15 extending outwardly from an inner wall thereof adjacent to the two stop plates 14 so as to define a housing trench 151, a first limitation trench 152, and a second limitation trench 153. In this embodiment, the fixing portion 15 is comprised of three ribs 150, and the housing trench 151 is defined by inner arcuate faces of the three ribs 150.

As shown in FIGS. 2 and 3, the control valve assembly 20 includes a right-angle valve block 21, a joining element 22, a mixing valve 23, a first cap 24, a second cap 25, and an operation lever 26.

Figure 7:
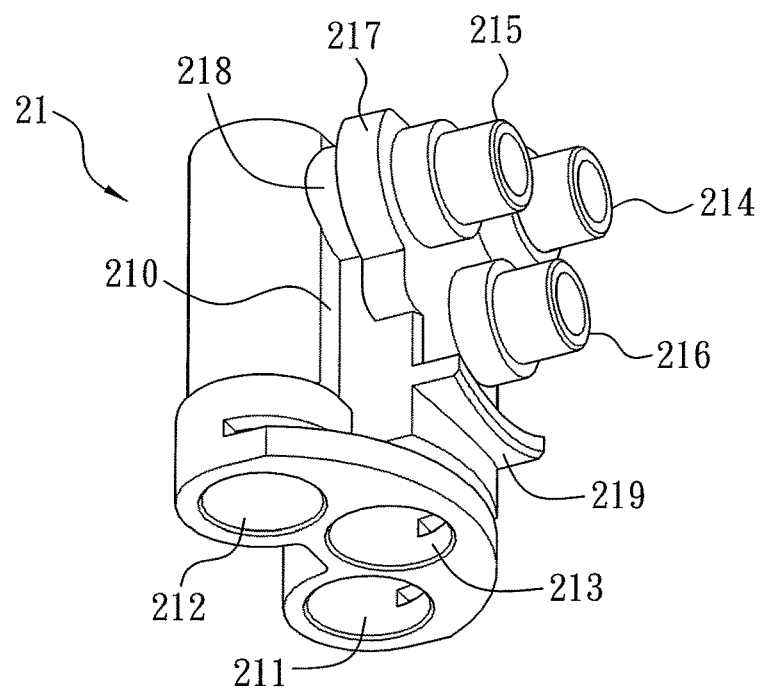
FIGS. 7-9 are a perspective view showing the assembly of a right-angle valve block of the pull-out faucet according to the preferred embodiment of the present invention.
Figure 8:
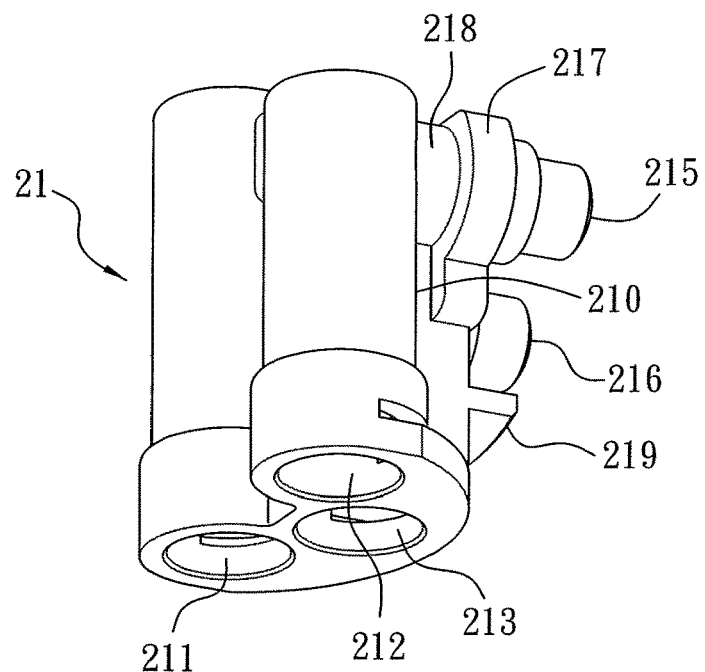
Figure 9:
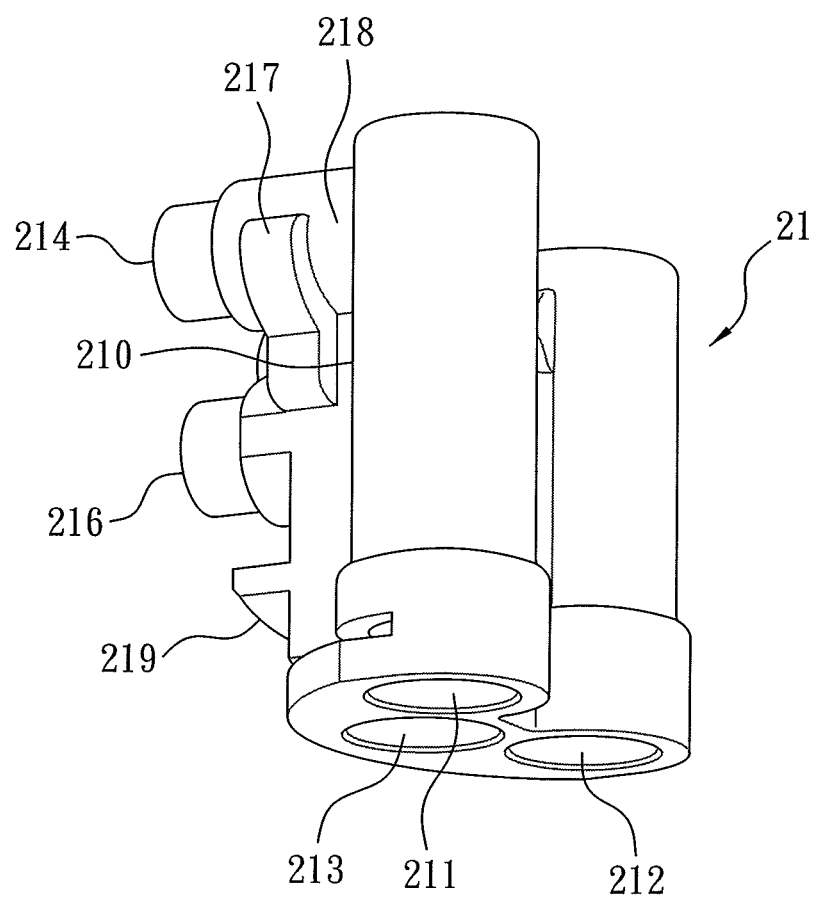
Figure 10:
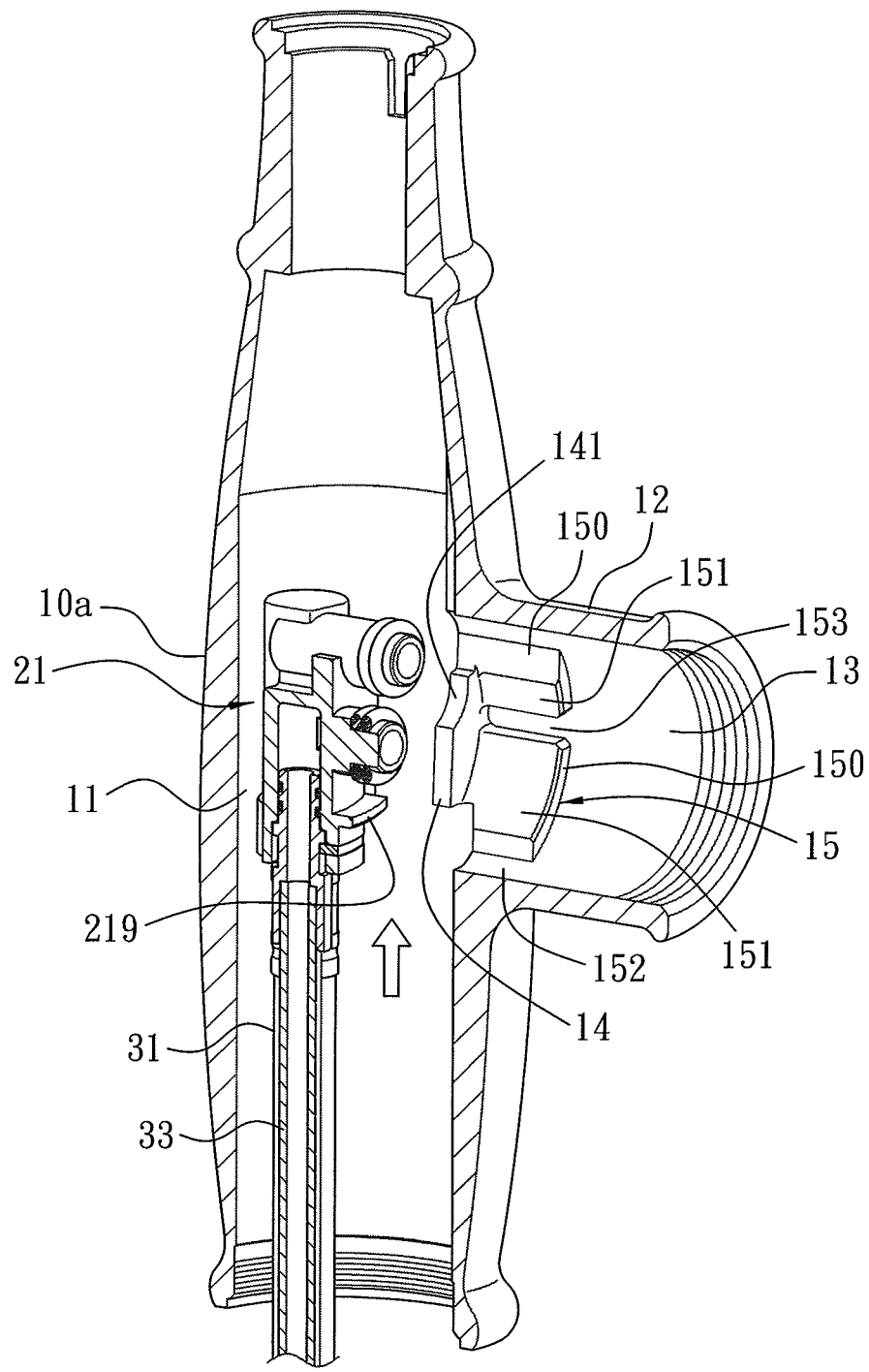
FIGS. 10-16 are a cross-sectional perspective view showing the operation of the right-angle valve block of the pull-out faucet according to the preferred embodiment of the present invention.
Figure 11:
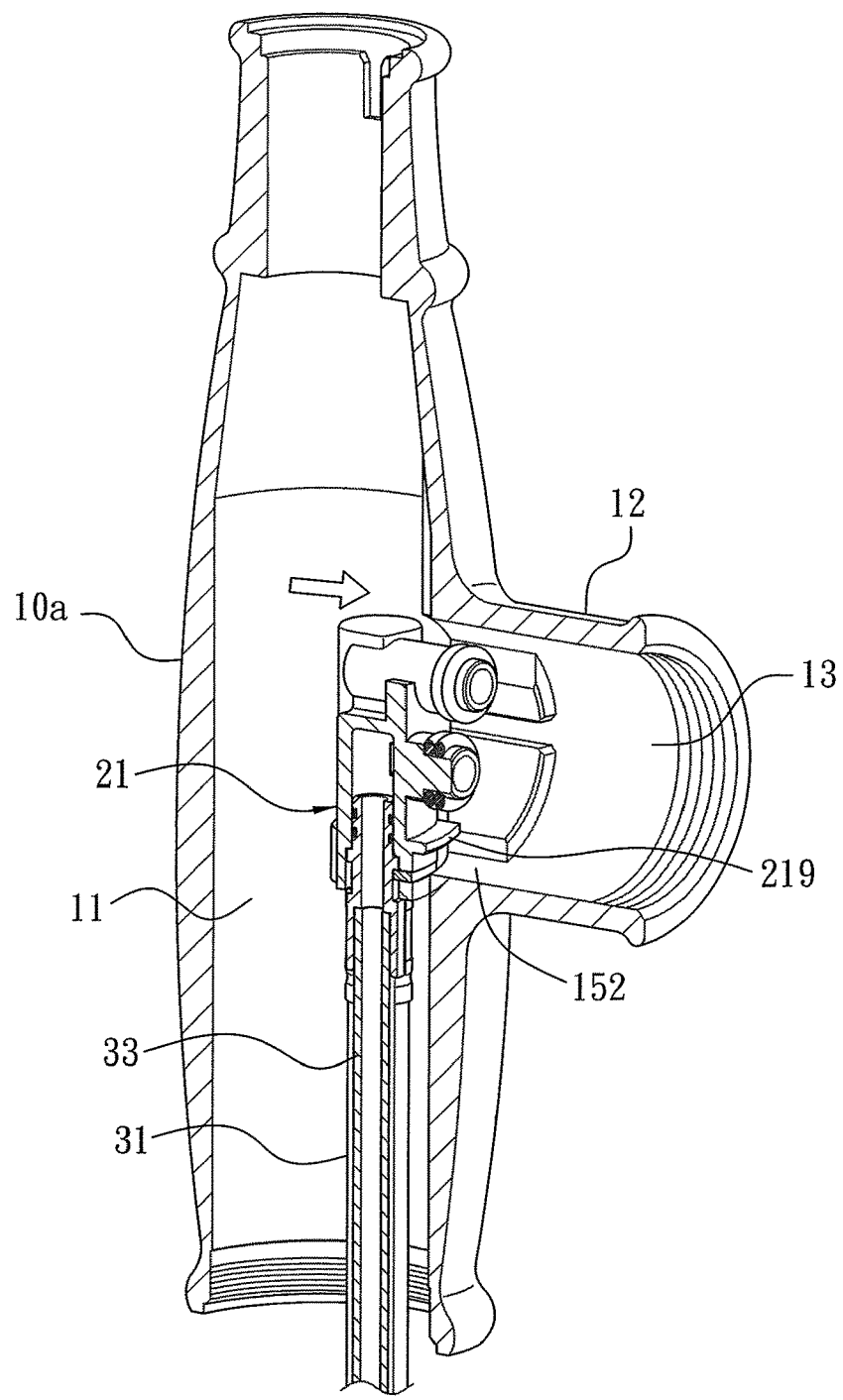
Figure 12:
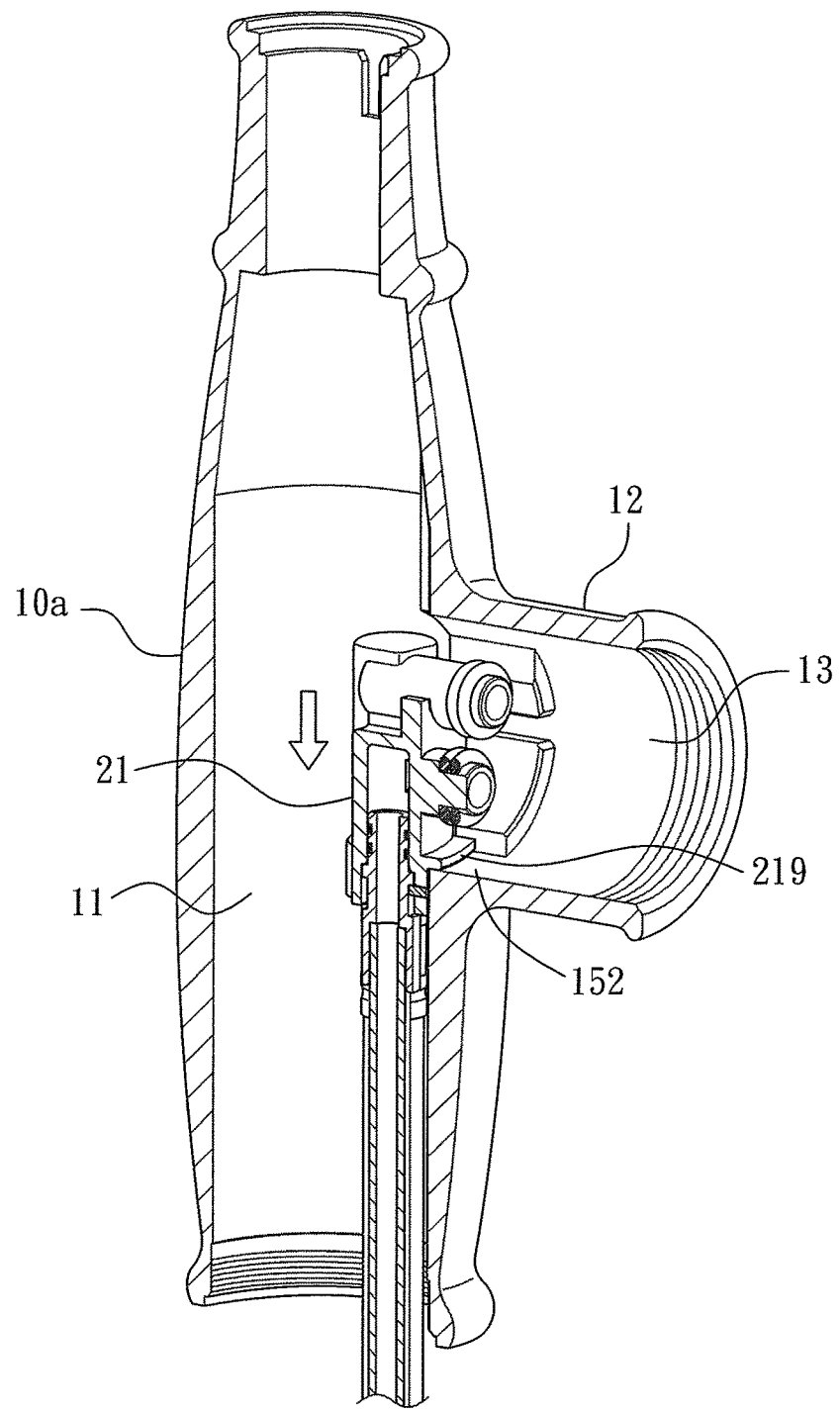
Figure 13:
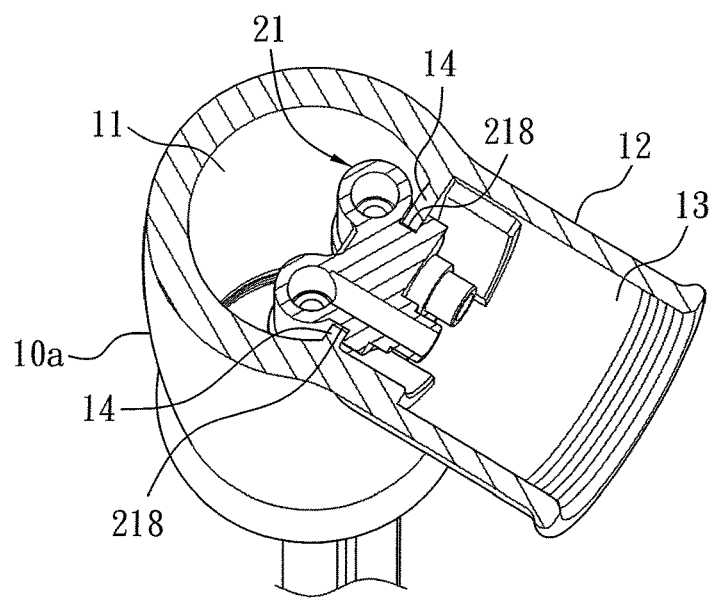

As illustrated in FIGS. 7-9, the right-angle valve block 21 has a first channel 211 configured to flow the cold water, a second channel 212 configured to flow the hot water, and a third channel 213 configured to flow the mixing water. The first channel 211, the second channel 212, and the third channel 213 are arranged on a bottom of the right-angle valve block 21, wherein the right-angle valve block 21 has a first coupling tube 214, a second coupling tube 215, and a third coupling tube 216 which are arranged on an outer wall of the right-angle valve block 21, wherein the first coupling tube 214 communicates with the first channel 211, the second coupling tube 215 is in communication with the second channel 212, and the third coupling tube 216 communicates with the third channel 213. The right-angle valve block 21 further has two shoulders 217, one of which is defined between outer walls of the first coupling tube 214 and the third coupling tube 216, and the other shoulder 217 is defined between outer walls of the second coupling tube 215 and the third coupling tube 216. The right-angle valve block 21 further has two opposite stopping faces 210 respectively formed on the outer wall thereof opposite to the two shoulders 217, wherein between each of the two shoulders 217 and each of the two stopping faces 210 is defined a locking slot 218.

With reference to FIGS. 10-13, the right-angle valve block 21 is upwardly inserted into the longitudinal chamber 11 of the hollow body 10 and facing the accommodation groove 13, and the right-angle valve block 21 is pulled downwardly so that the locking slot 218 retains with each stop plate 14, thus avoiding a removal of the right-angle valve block 21 from each stop plate 14. Preferably, the concaved support fringe 141 of each stop plate 14 matingly contacts with the locking slot 218. The right-angle valve block 21 further has an affix plate 219 extending from the outer wall thereof below the third coupling tube 216 so as to retain in the first limitation trench 152 of the casing 10a, thus fixing the right-angle valve block 21.

Figure 14:
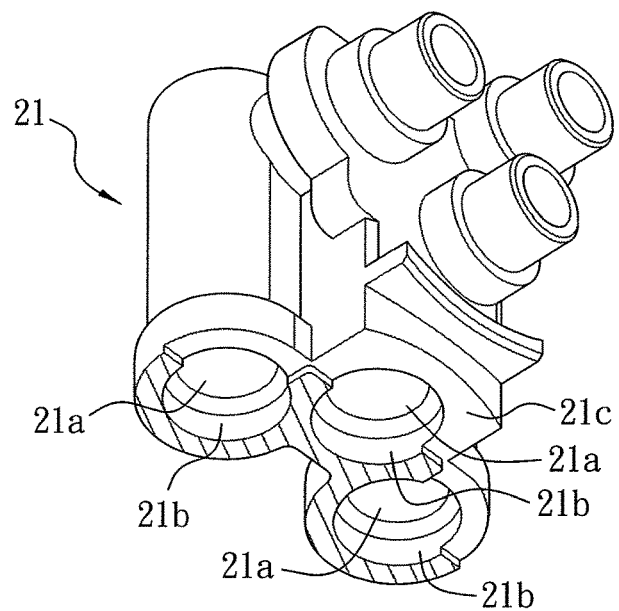
Figure 15:
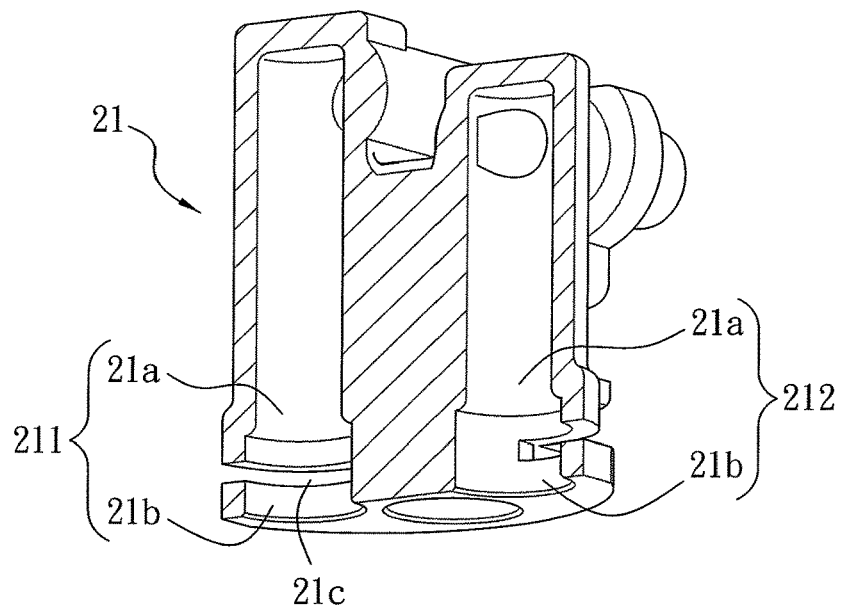
Figure 16:
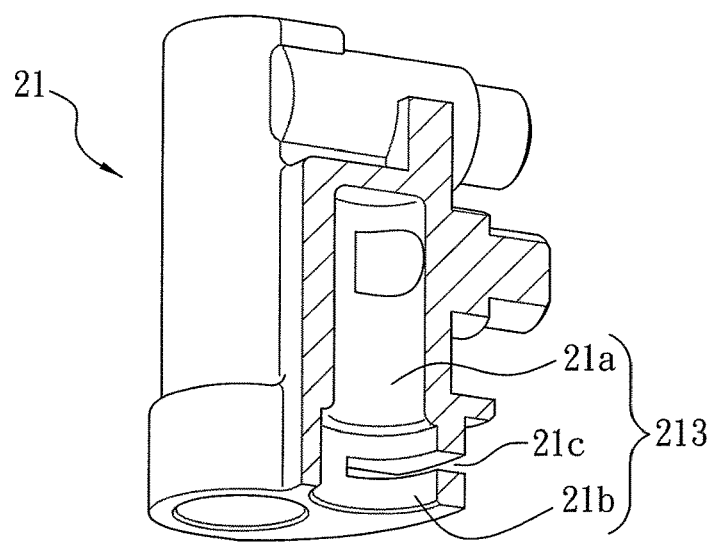
Figure 17:
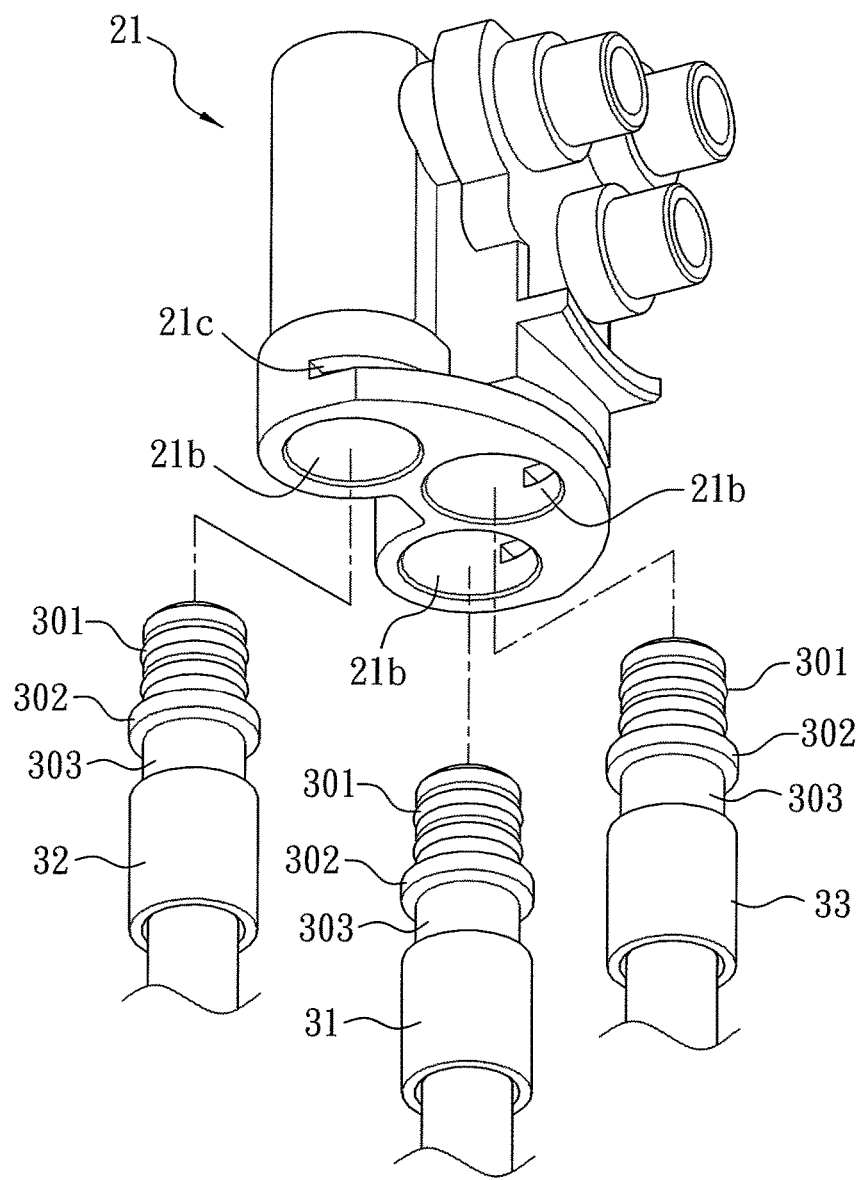
FIG. 17 is another perspective view showing the exploded components of a part of the pull-out faucet according to the preferred embodiment of the present invention.
Figure 18:
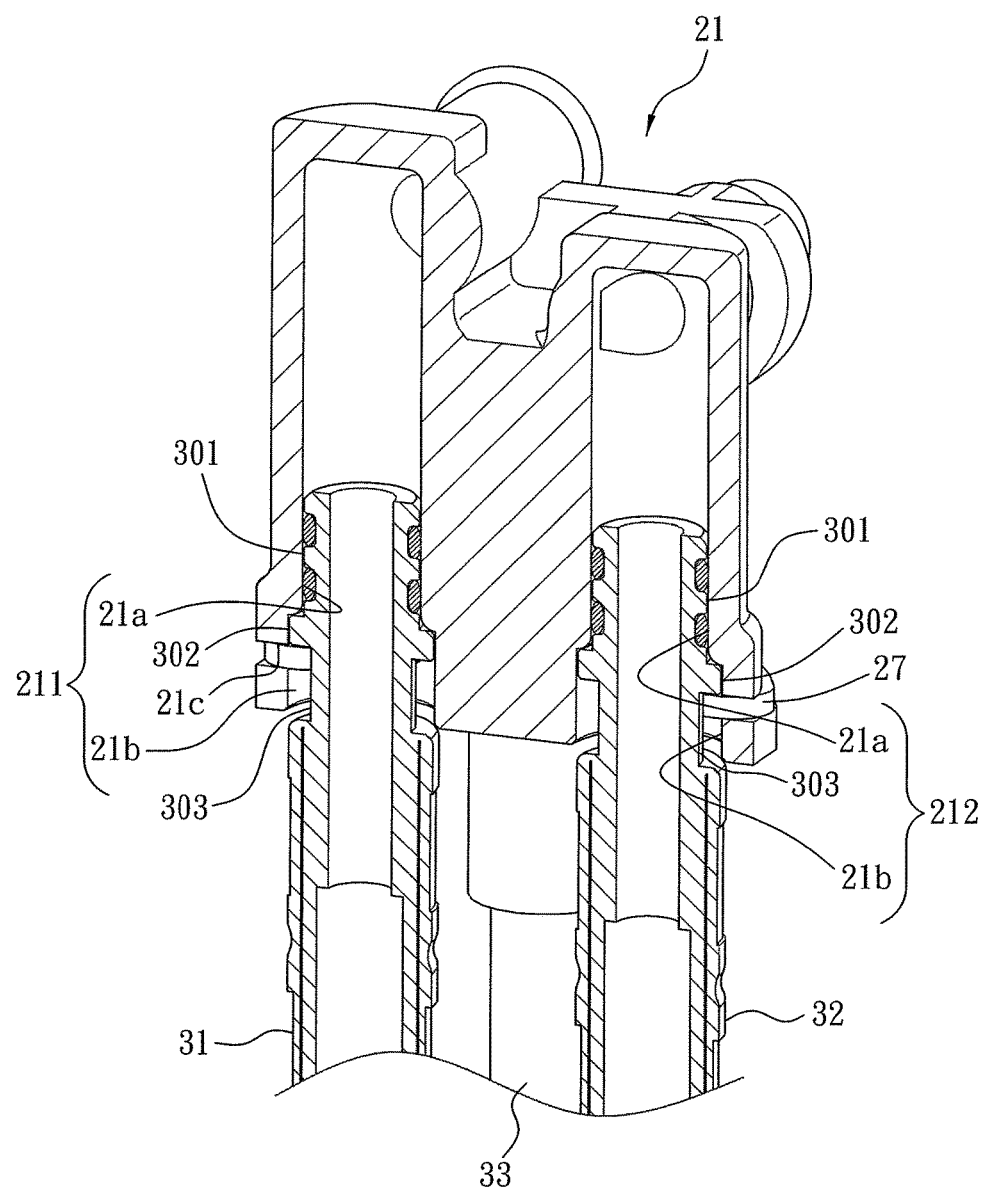
FIGS. 18-19 are another cross-sectional perspective view showing the operation of the right-angle valve block of the pull-out faucet according to the preferred embodiment of the present invention.
Figure 19:
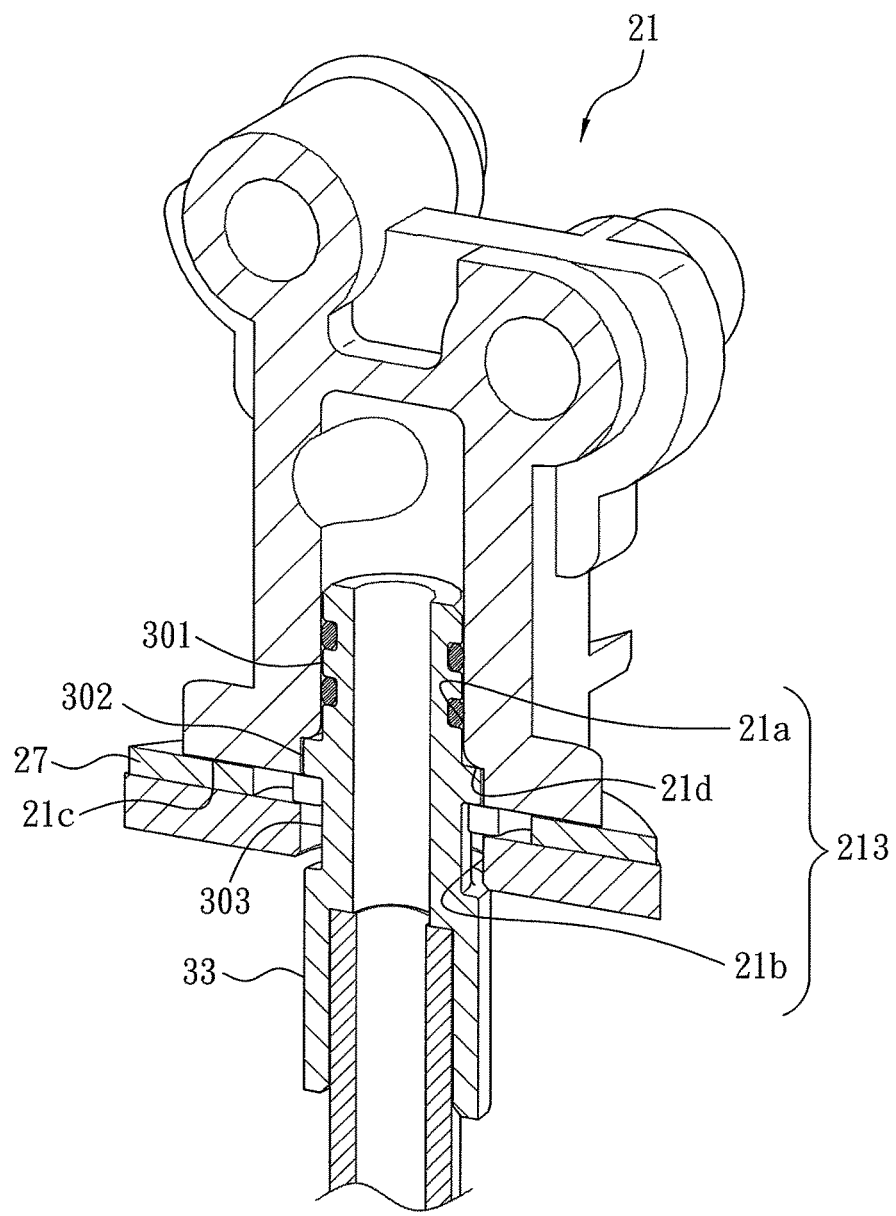

Referring to FIGS. 14-15, each of the first channel 211, the second channel 212, and the third channel 213 has an opening 21a and a through hole 21b communicating with the opening 21a. The right-angle valve block 21 further has a trough 21c communicating with the through hole 21b. As shown in FIGS. 17-19, each of the cold-water inflow tube 31, the hot-water inflow tube 32, and the mixing outflow tube 33 has a connection portion 301 configured to connect with the opening 21a, a contacting flange 302 adjacent to the connection portion 301 and configured to contact with a bottom face 21d of the through hole 21b, and a peripheral recess 303 proximate to the contacting flange 302, such that each of the cold-water inflow tube 31, the hot-water inflow tube 32, and the mixing outflow tube 33 closes the opening 21a by using the connection portion 301 until the contacting flange 302 abuts against the bottom face 21d of the through hole 21b.

Figure 20:
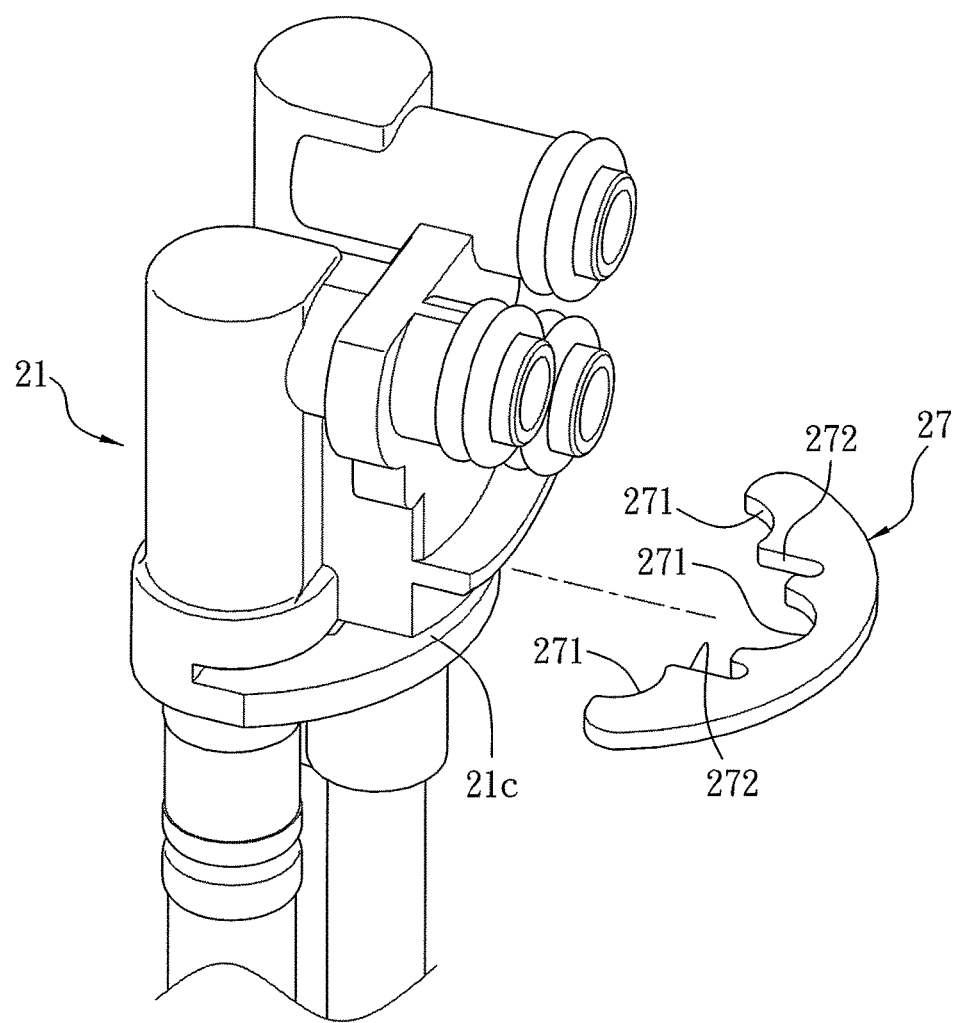
FIG. 20 is also another perspective view showing the exploded components of a part of the pull-out faucet according to the preferred embodiment of the present invention.
Figure 21:
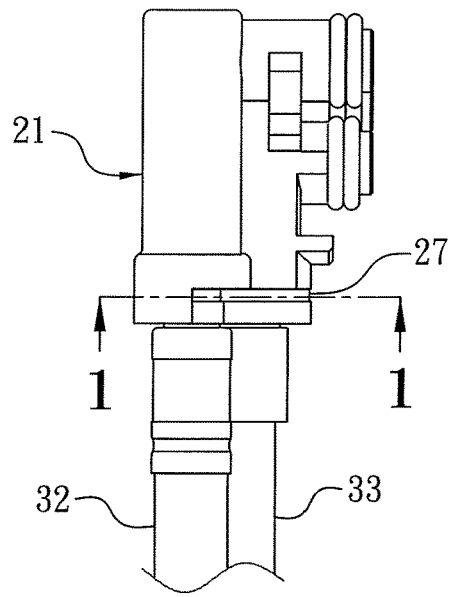
FIG. 21 is a side plan view of the pull-out faucet according to the preferred embodiment of the present invention.
Figure 22:
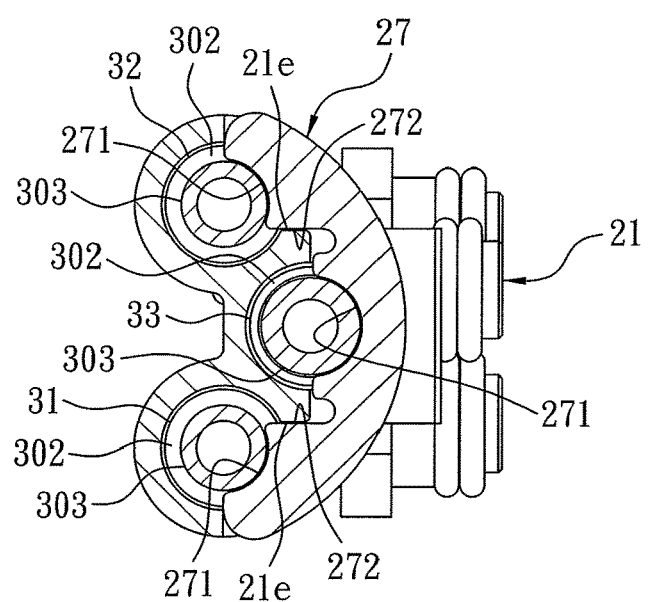
FIG. 22 is a cross sectional view taken along the line 1-1 of FIG. 21.
Figure 23:
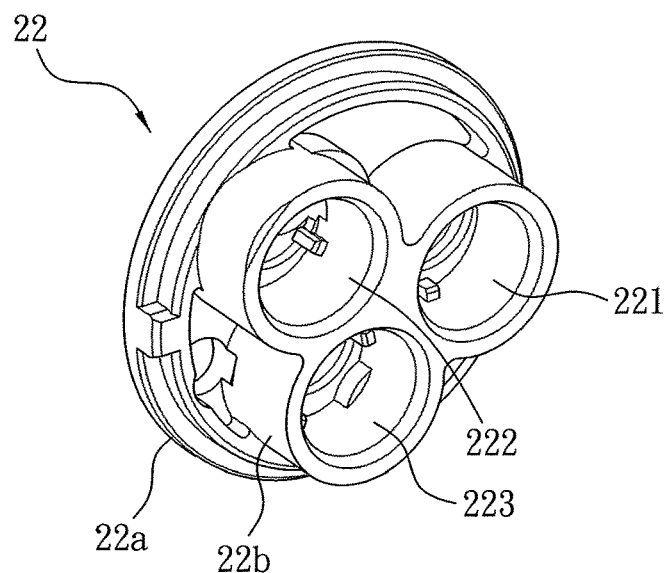
FIGS. 23-24 are a perspective view showing the assembly of a part of the pull-out faucet according to the preferred embodiment of the present invention.
Figure 24:
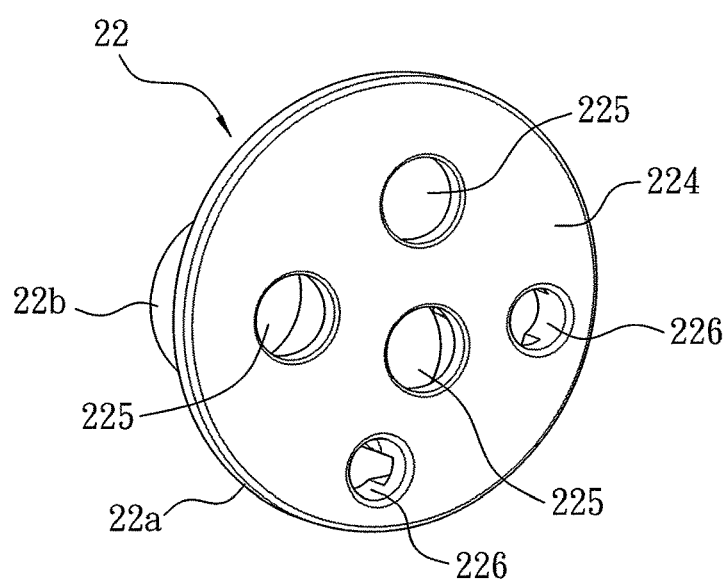
Figure 25:
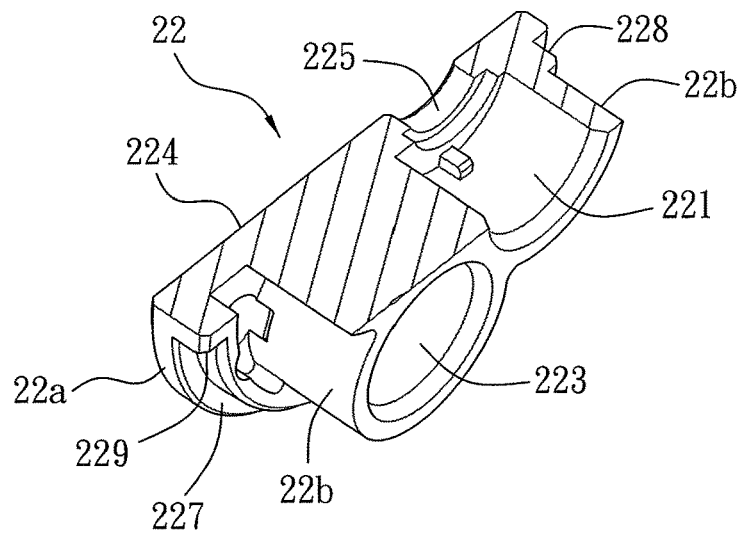
FIG. 25 is a cross-sectional perspective view showing the assembly of a joining element of the pull-out faucet according to the preferred embodiment of the present invention.
Figure 26:
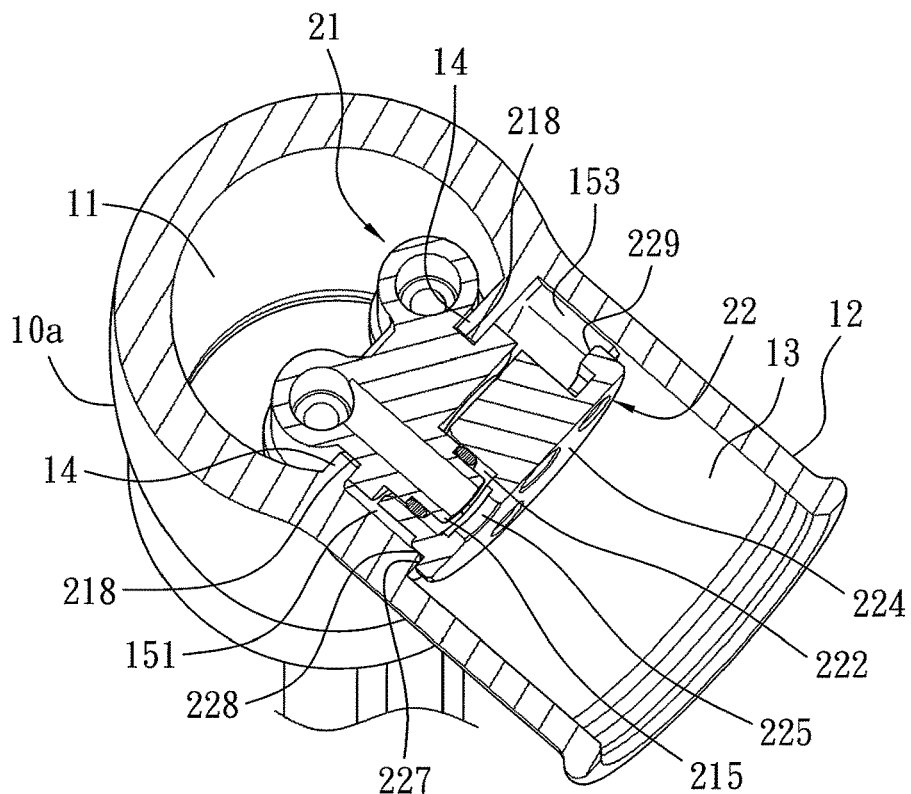
FIG. 26 is a cross-sectional perspective showing the operation of a part of the pull-out faucet according to the preferred embodiment of the present invention.

As illustrated in FIGS. 20-22, the control valve assembly 20 includes a retainer 27 accommodated in the trough 21c, and the retainer 27 has three concaved cutouts 271, wherein one of the three concaved cutouts 271 located on a middle of the retainer 27 engages in the peripheral recess 303 of the mixing outflow tube 33, and the other two concaved cutouts 271 respectively retain in two peripheral recesses 303 of the cold-water inflow tube 31 and the hot-water inflow tube 32.

With reference to FIGS. 20 and 22, the right-angle valve block 21 further has two guide fences 21e individually formed on two sides of the trough 21c, and the retainer 27 has two surrounding fences 272 formed among the three concaved cutouts 271 so as to guide two guide fences 21e respectively, hence the retainer 27 is retained in the trough 21c quickly and engages in the peripheral recess 303.

Referring to FIGS. 23-26, the joining element 22 has a circular base 22a and a fitting portion 22b extending outwardly from the circular base 22a, wherein the fitting portion 22b has a first orifice 221 fitting with the first coupling tube 214, a second orifice 222 fitting with the second coupling tube 215, and a third orifice 223 fitting with the third coupling tube 216. The circular base 22a has a connection face 224 on which three fourth orifices 225 are formed and respectively communicate with the first orifice 221, the second orifice 222, and the third orifice 223. The connection face 224 further has two fifth orifices 226 defined thereon. The circular base 22a has a first positioning fringe 227 formed on an outer wall thereof so as to contact with the three ribs 150, and the circular base 22a has a second positioning fringe 228 adjacent to the first positioning fringe 227 and has a protrusion 229 defined between the first positioning fringe 227 and the second positioning fringe 228 and retained in the second limitation trench 153 so as to limit a rotation of the joining element 22.

Figure 27:
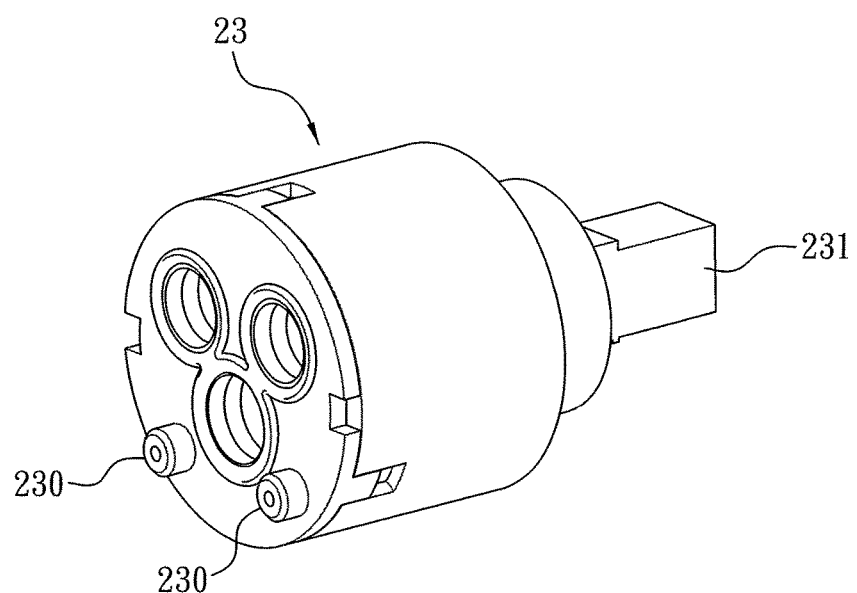
FIG. 27 is a perspective view showing the assembly of a mixing valve of the pull-out faucet according to the second embodiment of the present invention.

As shown in FIGS. 3 and 27, the mixing valve 23 is housed in the accommodation groove 13 and contacts with the connection face 224 of the joining element 22, wherein the mixing valve 23 has two bolts 230 inserted into the two fifth orifices 226 of the connection face 224 individually so that the cold water and the hot water respectively flow into the mixing valve 23 from the first coupling tube 214 and the second coupling tube 215 of the right-angle valve block 21 via the first orifice 221, the second orifice 222, and two fourth orifices 225 which respectively communicate with the first orifice 221 and the second orifice 222, wherein the cold water and the hot water mixes in the mixing valve 23 at a predetermined ratio so as to produce the mixing water, and the mixing water flows out of the third coupling tube 216 of the right-angle valve block 21 via the other fourth orifice 225 which communicates with the third orifice 223. The mixing valve 23 has a rotary shaft 231. Since the mixing valve 23 and the right-angle valve block 21 are well-known art, further remarks are omitted.

The first cap 24 is screwed with the accommodation groove 13 so as to abut the mixing valve 23 against the accommodation groove 13.

The second cap 25 is screwed with the first cap 24 and abuts against the seat portion 12 so as to embellish the first cap 24.

The operation lever 26 is connected with the rotary shaft 231 of the mixing valve 23, hence the operation lever 26 drives the rotary shaft 231 to control water flow and to adjust water temperature. Due to the firs cap 24, the second cap 25, and the operation lever 26 are well-known art, further remarks are omitted.

In assembly, the cold-water inflow tube 31, the hot-water inflow tube 32, and the mixing outflow tube 33 are individually accommodated in the first channel 211, the second channel 212, and the third channel 213, thereafter the retainer 27 is retained in the trough 21c so as to fix the cold-water inflow tube 31, the hot-water inflow tube 32, and the mixing outflow tube 33 in the right-angle valve block 21 quickly.

Then, the right-angle valve block 21 is upwardly inserted into the longitudinal chamber 11 of the hollow body 10 and faces the accommodation groove 13, and the right-angle valve block 21 is pulled downwardly so that the locking slot 218 of the right-angle valve block 21 retains with each stop plate 14, and the affix plate 219 is retained in the first limitation trench 152, thus fixing the right-angle valve block 21.

Finally, the protrusion 229 of the joining element 22 is retained in the second limitation trench 153 so that the second positioning fringe 228 is retained in the housing trench 151 until the first positioning fringe 227 contacts with the three ribs 150, thus connecting the mixing valve 23, the first cap 24, the second cap 25, and the operation lever 26 together.

Accordingly, a size of the longitudinal chamber 11 increases so as to accommodate the right-angle valve block 21 in the accommodation groove 13 easily and to avoid a collision of the right-angle valve block 21 with the casing 10a.

The right-angle valve block 21 and the mixing valve 23 are matingly connected together by way of the joining element 23 so as to reduce a size of the right-angle valve block 21 and to accommodate the right-angle valve block 21 in the accommodation groove 13 easily via the longitudinal chamber 11. Preferably, the cold water, the hot water, and the mixing water flow in the right-angle valve block 21 and the mixing valve 23 smoothly by using the joining element 22.

Preferably, the cold-water inflow tube 31, the hot-water inflow tube 32, and the mixing outflow tube 33 are individually accommodated in the first channel 211, the second channel 212, and the third channel 213, thereafter the retainer 27 is retained in the trough 21c so as to fix the cold-water inflow tube 31, the hot-water inflow tube 32, and the mixing outflow tube 33 in the right-angle valve block 21 quickly.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A pull-out faucet comprising: a hollow body, a control valve assembly mounted on the hollow body, a water supply pipe set communicating with the control valve assembly, a water hose communicating with the water supply pipe set so as to supply water, and a spray head disposed on an outlet segment of the hollow body and communicating with the water hose;
   wherein the water supply pipe set includes a cold-water inflow tube, a hot-water inflow tube, and a mixing outflow tube;
   wherein the hollow body includes a longitudinal chamber defined therein and includes an accommodation groove communicating with the longitudinal chamber; and two opposite stop plates are arranged on a communication portion of the longitudinal chamber and the accommodation groove;
   wherein the control valve assembly includes:
   a right-angle valve block having a first channel configured to flow cold water, a second channel configured to flow hot water, and a third channel configured to flow mixing water of the cold water and the hot water;
   wherein the first channel, the second channel, and the third channel are arranged on a bottom of the right-angle valve block; wherein the right-angle valve block has a first coupling tube, a second coupling tube, and a third coupling tube which are arranged on an outer wall of the right-angle valve block, wherein the first coupling tube communicates with the first channel, the second coupling tube is in communication with the second channel, and the third coupling tube communicates with the third channel, the right-angle valve block further has two shoulders, one of which is defined between outer walls of the first coupling tube and the third coupling tube, and the other shoulder is defined between outer walls of the second coupling tube and the third coupling tube, wherein the right-angle valve block further has two opposite stopping faces respectively formed on the outer wall thereof opposite to the two shoulders, and between each of the two shoulders and each of the two stopping faces is defined a locking slot; wherein when the right-angle valve block is upwardly inserted into the longitudinal chamber of the hollow body and facing the accommodation groove, and the right-angle valve block is pulled downwardly so that the locking slot retains with each of the two opposite stop plates, thus avoiding the right-angle valve block from being removed from the accommodation groove;

a joining element accommodated in the accommodation groove and connecting with the first coupling tube, the second coupling tube, and the third coupling tube of the right-angle valve block;

a mixing valve housed in the accommodation groove and contacting with the joining element so as to communicate with the first coupling tube, the second coupling tube, and the third coupling tube;

a first cap configured to fix the mixing valve in the accommodation groove; and an operation lever configured to turn on/off and control the mixing valve.

2. The pull-out faucet as claimed in claim 1, wherein the hollow body includes a casing and a bent tube extending outwardly from a top of the casing; the casing has the longitudinal chamber defined within the casing and a seat portion horizontally extending outward from the casing, and the accommodation groove is formed in the seat portion.

3. The pull-out faucet as claimed in claim 1, wherein the accommodation groove has a fixing portion extending outwardly from an inner wall thereof adjacent to the two stop plates so as to define a first limitation trench; the right-angle valve block further has an affix plate extending from the outer wall thereof below the third coupling tube so as to retain in the first limitation trench of the casing, thus fixing the right-angle valve block.

4. The pull-out faucet as claimed in claim 3, wherein the fixing portion defines a housing trench and a second limitation trench.

5. The pull-out faucet as claimed in claim 4, wherein the fixing portion is comprised of three ribs, and the housing trench is defined by inner arcuate faces of the three ribs.

6. The pull-out faucet as claimed in claim 4, wherein the joining element has a circular base and a fitting portion extending outwardly from the circular base; the fitting portion has a first orifice fitting with the first coupling tube, a second orifice fitting with the second coupling tube, and a third orifice fitting with the third coupling tube; the circular base has a first positioning fringe formed on an outer wall thereof so as to contact with three ribs of the fixing portion, and the circular base has a second positioning fringe adjacent to the first positioning fringe and has a protrusion defined between the first positioning fringe and the second positioning fringe and retained in the second limitation trench so as to limit a rotation of the joining element.

7. The pull-out faucet as claimed in claim 6, wherein the circular base has a connection face on which three passing orifices are formed and respectively communicate with the first orifice, the second orifice, and the third orifice; the connection face further has two receiving orifices defined thereon.

8. The pull-out faucet as claimed in claim 7, wherein the mixing valve contacts with the connection face of the joining element and has two bolts inserted into the two receiving orifices of the connection face individually so that the mixing valve communicates with the first coupling tube, the second coupling tube, and the third coupling tube of the right-angle valve block via the three passing orifices of the joining element.

9. The pull-out faucet as claimed in claim 1, wherein each stop plate has a concaved support fringe formed on a top thereof so as to matingly contact with the locking slot of the right-angle valve block.

10. The pull-out faucet as claimed in claim 1, wherein the right-angle valve block further has a trough communicating with the first channel, the second channel, and the third channel; and each of the cold-water inflow tube, the hot-water inflow tube, and the mixing outflow tube has a peripheral recess; the control valve assembly includes a retainer accommodated in the trough and engaging in the peripheral recess, thus avoiding the cold-water inflow tube, the hot-water inflow tube, and the mixing outflow tube from removing from the first channel, the second channel, and the third channel respectively.

11. The pull-out faucet as claimed in claim 10, wherein each of the first channel, the second channel, and the third channel has an opening and a through hole communicating with the opening and the trough; each of the cold-water inflow tube, the hot-water inflow tube, and the mixing outflow tube has a connection portion configured to connect with the opening, a contacting flange adjacent to the connection portion and configured to contact with a bottom face of the through hole, and the peripheral recess proximate to the contacting flange; the retainer has three concaved cutouts, wherein one of the three concaved cutouts located on a middle of the retainer engages in the peripheral recess of the mixing outflow tube, and the other two concaved cutouts respectively retain in two peripheral recesses of the cold-water inflow tube and the hot-water inflow tube.

12. The pull-out faucet as claimed in claim 11, wherein the right-angle valve block further has two guide fences individually formed on two sides of the trough, and the retainer has two surrounding fences formed among the three concaved cutouts so as to guide two guide fences respectively, hence the retainer is retained in the trough quickly.

* * * * *